(12) United States Patent
Super et al.

(10) Patent No.: US 7,657,557 B2
(45) Date of Patent: Feb. 2, 2010

(54) GENERATING CODE ON A NETWORK

(75) Inventors: Michael Andrew Super, Merrimack, NH (US); Balaji Adikesavelu, Bedford, NH (US)

(73) Assignee: FMR LLC, Boston, MA (US)

( * ) Notice: Subject to any disclaimer, the term of this patent is extended or adjusted under 35 U.S.C. 154(b) by 295 days.

(21) Appl. No.: 11/694,530

(22) Filed: Mar. 30, 2007

(65) Prior Publication Data
US 2008/0243901 A1    Oct. 2, 2008

(51) Int. Cl.
  G06F 17/00   (2006.01)
  G06F 17/30   (2006.01)
(52) U.S. Cl. .................. 707/102; 707/1; 707/104.1; 707/200; 715/234; 715/237; 715/239
(58) Field of Classification Search .............. None
  See application file for complete search history.

(56) References Cited

U.S. PATENT DOCUMENTS

| | | | |
|---|---|---|---|
| 5,359,546 A * | 10/1994 | Hayes et al. ............ | 702/123 |
| 6,128,730 A | 10/2000 | Levine .................... | 713/1 |
| 2003/0018661 A1 * | 1/2003 | Darugar .................. | 707/500 |
| 2003/0229522 A1 | 12/2003 | Thompson et al. ......... | 705/4 |
| 2004/0181753 A1 | 9/2004 | Michaelides | |
| 2004/0210445 A1 | 10/2004 | Veronese et al. | |
| 2004/0250238 A1 | 12/2004 | Singh et al. | |
| 2005/0065983 A1 * | 3/2005 | Wang et al. ............ | 707/200 |
| 2005/0155016 A1 | 7/2005 | Bender | |
| 2005/0222969 A1 | 10/2005 | Yip et al. ............... | 707/1 |

FOREIGN PATENT DOCUMENTS

WO    02/073402    9/2002

\* cited by examiner

*Primary Examiner*—Greta L Robinson
*Assistant Examiner*—James J Wilcox
(74) *Attorney, Agent, or Firm*—Proskauer Rose LLP

(57) ABSTRACT

Described are computer-based methods and apparatuses, including computer program products, for generating code on a network. Input files including information files and schema files are utilized to generate platform independent runtime files. The processing of the runtime files generates one or more business service applications. The runtime files map data between a standard format and an internal format.

28 Claims, 7 Drawing Sheets

GENERATING CODE ON A NETWORK

CROSS REFERENCE TO RELATED APPLICATIONS

This application is related to U.S. Pat. No. 7,603,368, filed Mar. 30, 2007, and entitled "Mapping Data on a Network" which is commonly assigned to the same entity.

FIELD OF THE INVENTION

The present invention relates generally to computer-based methods and apparatuses, including computer program products, for generating code on a network.

BACKGROUND

The increased use of computers to request, transmit, and store information has caused an expansion in the amount of information stored on computer systems. The expanded amount of data stored on computer systems has also caused an increase in the amount of data that is accessed through the computer systems. To handle this increase in the amount of information, computer systems have developed schemes to store the large amounts of data. However, some of these schemes to store the data are propriety formats and protocols that when utilized only provide access to the data stored on that computer system.

The increased use of computers also has lead to a large number of services that are provided through web servers over the world wide web. The increased use of the world wide web has changed the dynamics of many business applications from a client-server architecture to a web server-web browser architecture. The web architecture allows for users to access applications from almost any location by using a commonly configured web browser.

SUMMARY OF THE INVENTION

One approach to is generating code on a network. In one aspect, there is a method for generating code on a network. A plurality of input files are received and a plurality of runtime files are generated based on the plurality of input files. The input files include a first input file, a second input file, a third input file, and a fourth input file. The first input file includes data associated with service operation information. The second input file includes data associated with mapping information. The third input file includes a schema defining a format of the service operation information. The fourth input file includes a schema defining the format of the mapping information. The runtime files include a first runtime file, a second runtime file, and one or more executable files. The first runtime file includes query information. The second runtime file includes business services definition information. The one or more executable files includes platform independent executable files.

In another aspect, there is a computer program product for generating code on a network. The computer program product is tangibly embodied in an information carrier. The computer program product includes instructions being operable to cause a data processing apparatus to receive a plurality of input files generate a plurality of runtime files based on the plurality of input files. The input files include a first input file, a second input file, a third input file, and a fourth input file. The first input file includes data associated with service operation information. The second input file includes data associated with mapping information. The third input file includes a schema defining a format of the service operation information. The fourth input file includes a schema defining the format of the mapping information. The runtime files include a first runtime file, a second runtime file, and one or more executable files. The first runtime file includes query information. The second runtime file includes business services definition information. The one or more executable files includes platform independent executable files.

In another aspect, there is a system for generating code on a network. The system includes a computing device. The computing device is configured to receive a plurality of input files and generate a plurality of runtime files based on the plurality of input files. The input files include a first input file, a second input file, a third input file, and a fourth input file. The first input file includes data associated with service operation information. The second input file includes data associated with mapping information. The third input file includes a schema defining a format of the service operation information. The fourth input file includes a schema defining the format of the mapping information. The runtime files include a first runtime file, a second runtime file, and one or more executable files. The first runtime file includes query information. The second runtime file includes business services definition information. The one or more executable files includes platform independent executable files.

In another aspect, there is a system for generating code on a network. The system includes a means for receiving a plurality of input files and a means for generating a plurality of runtime files based on the plurality of input files. The input files include a first input file, a second input file, a third input file, and a fourth input file. The first input file includes data associated with service operation information. The second input file includes data associated with mapping information. The third input file includes a schema defining a format of the service operation information. The fourth input file includes a schema defining the format of the mapping information. The runtime files include a first runtime file, a second runtime file, and one or more executable files. The first runtime file includes query information. The second runtime file includes business services definition information. The one or more executable files includes platform independent executable files.

Another approach is mapping data on a network. In one aspect, there is a method of mapping data on a network. The method includes receiving data in a first predetermined format. The data in the first predetermined format is mapped to a second predetermined format using at least one mapping type selected from a set of mapping types. The set of mapping types include a first mapping type associated with value mapping, a second mapping type associated with direct mapping, a third mapping type associated with constant mapping, a fourth mapping type associated with conditional mapping, and a fifth mapping type associated with collection mapping.

In another aspect, there is a computer program product for mapping data on a network. The computer program product is tangibly embodied in an information carrier. The computer program product including instructions being operable to cause a data processing apparatus to receive data in a first predetermined format and map the data from the first predetermined format to a second predetermined format using at least one mapping type selected from a set of mapping types. The set of mapping types include a first mapping type associated with value mapping, a second mapping type associated with direct mapping, a third mapping type associated with constant mapping, a fourth mapping type associated with conditional mapping, and a fifth mapping type associated with collection mapping.

In another aspect, there is a system for mapping data on a network. The system includes a computing device. The computing device is configured to receive data in a first predetermined format and map the data from the first predetermined format to a second predetermined format using at least one mapping type selected from a set of mapping types. The set of mapping types include a first mapping type associated with value mapping, a second mapping type associated with direct mapping, a third mapping type associated with constant mapping, a fourth mapping type associated with conditional mapping, and a fifth mapping type associated with collection mapping.

In another aspect, there is a system for mapping data on a network. The system includes a means for receiving data in a first predetermined format and a means for mapping the data from the first predetermined format to a second predetermined format using at least one mapping type selected from a set of mapping types. The set of mapping types include a first mapping type associated with value mapping, a second mapping type associated with direct mapping, a third mapping type associated with constant mapping, a fourth mapping type associated with conditional mapping, and a fifth mapping type associated with collection mapping.

In other examples, any of the aspects above can include one or more of the following features. An interface documentation file is generated. The interface documentation file includes information associated with a business service application. Information associated with a backend server is received. The generation of the plurality of runtime files is based on the information associated with the backend server.

In some examples, it is determined if the first input file and the second input file corresponds to the format as defined in the third input file and/or the fourth input file. The determining includes validating that the first input file and the second input file is in the format as defined in the third input file and/or the fourth input file.

In other examples, the plurality of runtime files further includes a third runtime file comprising web services description language information based on the first input file. The plurality of runtime files further includes one or more test files including a test driver and/or information associated with the test driver.

In some examples, one or more business service applications associated with the runtime files are generated. Requests are processed to map data from an internal format to a standard format and/or to map data from the standard format to the internal format. The plurality of the input files include information associated with a business service application. The business service application is a human resource application, an employee benefit application, an employee retirement application, and/or a payroll application.

In other examples, the first input file further includes operation definitions for mapping input data, request information for each operation definition, and/or response information for each operation definition. The second input file further includes one or more mapping fields for mapping input data and/or one or more mapping logic operations for mapping input data. The third input file further includes a service definition defining one or more data elements associated with input data for return.

In some examples, the format of the mapping information is human resource extensible markup language (HR-XML). The platform independent executable files are Java executable files. The platform independent executable files are Java service class files. The query information is in extensible markup language (XML) format.

In other examples, the plurality of runtime files further includes a third runtime file comprising web services description language information based on the first input file. A WSDL module is configured to generate the third runtime file based on the first input file. A service module is configured to generate the one or more executable files based on the third runtime file. A query module is configured to generate the first runtime file based on the first input file.

In some examples, a platform independent executable module is configured to generate the one or more platform independent executable files based on the first input file, the second input file, the third input file, and/or the fourth input file. The platform independent executable module is configured to generate one or more test files based on the first input file, the second input file, the third input file, and/or the fourth input file.

In other examples, a class module is configured to generate the one or more platform independent executable files based on the first input file, the second input file, the third input file, and/or the fourth input file.

In some examples, the first predetermined format is a standard format and the second predetermined format is an internal format.

In other examples, the first predetermined format is an internal format and the second predetermined format is a standard format. The standard format is human resources extensible markup language (HR-XML). The internal format is based on a proprietary standard associated with one or more internal data servers.

In some examples, the mapping of the data further includes determining a data item in the internal format selected from a plurality of data items associated with each other in a hierarchical association and determining a mapping type from the set of mapping types based on the data item.

In other examples, the data is transmitted in the second predetermined format in response to a request for the data. The request for the data is associated with a business service application. The business service application is a human resource application, an employee benefit application, an employee retirement application, and/or a payroll application.

In some examples, the data is transmitted in the second predetermined format to a data server and the data is stored in the second predetermined format on the data server. A map module is configured to receive the data in the first predetermined format. One or more platform independent executable files are configured to map the data. The one or more platform independent executable files are Java executable files, and/or Java service class files. A data server is configured to receive data in the second predetermined format and store the data in the second predetermined format.

Any of the aspects and examples above can provide one or more of the following advantages. An advantage to the techniques of generating code on a network as described herein is that platform independent code can be generated for different business service applications, which allows for various business models to be utilized for customers. An additional advantage is that the use of the input files allows for services to be generated for clients with a minimal amount of coding, which reduces errors and the cost to produce the business services for a client.

Another advantage is the synergistic mapping of data stored in an internal format to multiple business applications through the generation of code for use by the business applications. An additional advantage is the ability to share data in the internal format with numerous business applications through the generation of code that allows for the mapping of the data to the standard format. Another advantage is that the business applications will utilize a standard interface to the data which separates the business logic associated with the data from the business logic of the business application.

An advantage to the mapping of data techniques described herein is that the use of platform independent files allows for the mapping of data using multiple computer systems utilizing a wide range of operating systems. Another advantage is the synergistic ability to access data in a variety of internal formats by utilizing a standard format for the interface to the users. An additional advantage is that the different data types allow for data to be efficiently and accurately classified for use by the mapping types.

Another advantage is the use of different mapping types which allow for both simple and complex mapping between the standard interface and the internal interface. Another advantage is that the standard format that is utilized allows for a wide range of business applications to access the data that is stored in the internal format, thereby increasing the overall value of the data in the internal format by allowing it to be accessible and useable by the business organization. An additional advantage is that standard formats and protocols allows users of data to avoid having to learn and utilize propriety formats and protocols for every computer system that has stored data that the user needs to access. Another advantage is that standard formats and protocols allow uniform access across multiple computer systems to the stored data.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

In general overview, a plurality of input files are received. The plurality of input files are utilized to generate a plurality of runtime files. The plurality of input files include a service operation information file, a mapping information file, a schema defining the format of the service operation information, and/or a schema defining the standard format of data. The plurality of runtime files include a query information file, a business services definition file, one or more platform independent executable files, and/or one or more platform independent service class files. The processing of the runtime files generates one or more business service applications that process requests and map data between a standard format and an internal format.

Data is received in either a standard format or an internal format. The data is mapped using at least one mapping type from a set of mapping types. The mapping types include value mapping, direct mapping, constant mapping, conditional mapping, and collection mapping. The mapping types are utilized to map the data between the standard format and the internal format. The standard format can be, for example, a human resources extensible markup language (HR-XML). The internal format can be, for example, a proprietary standard based on the format of data in internal data servers.

Figure 1:
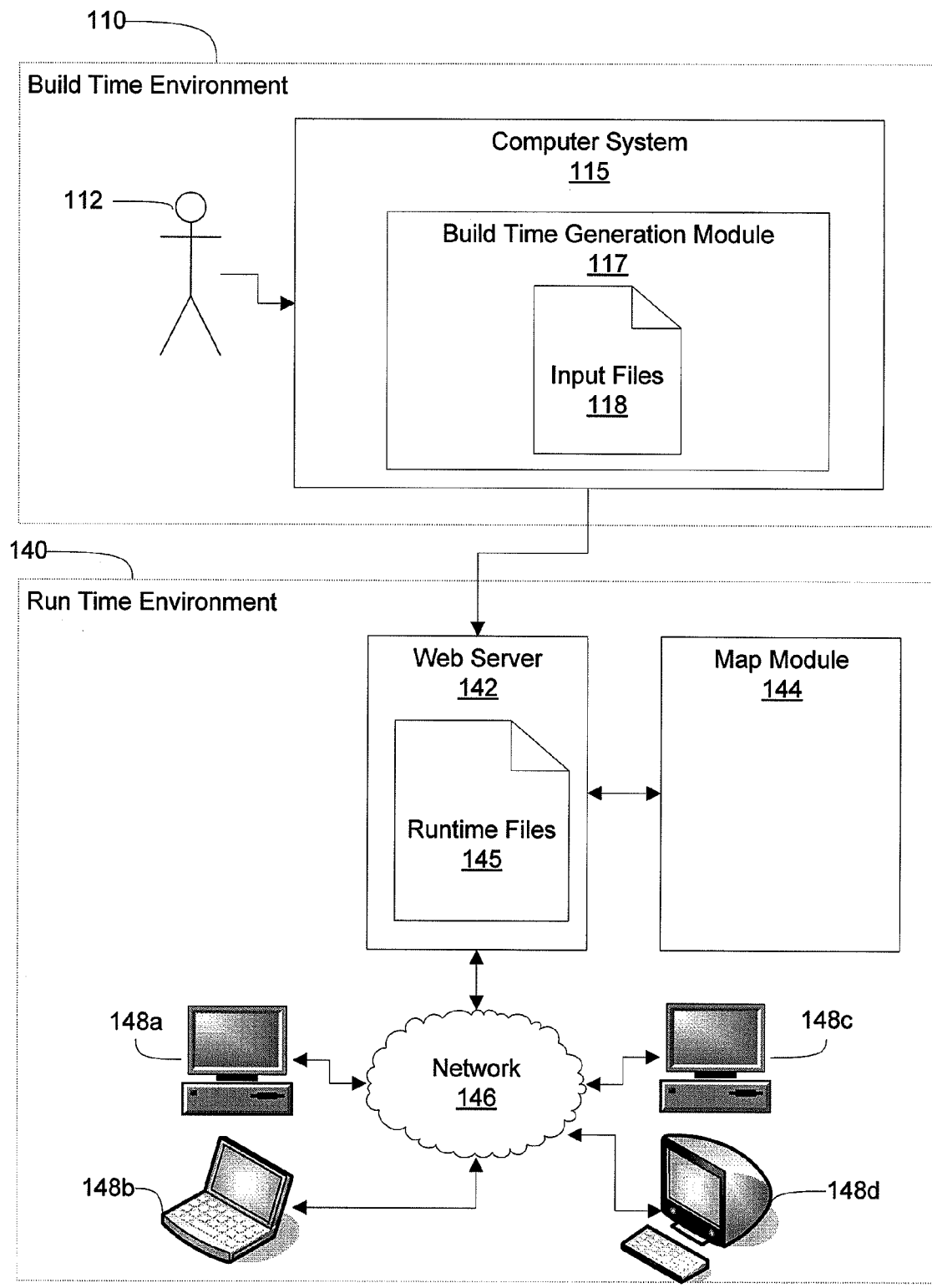
FIG. 1 is a functional block diagram of an exemplary system illustrating a build time environment and a run time environment.

FIG. 1 is a functional block diagram of an exemplary system 100 illustrating a build time environment 110 and a run time environment 140. Referring to the build time environment 110, a user 112 inputs a plurality of input files 118 to a computer system 115 that includes a build time generation module 117. The build time generation module 117 receives the plurality of input files 118 and generates a plurality of runtime files 145 based on the input files 118.

Referring to the runtime environment 140, the runtime files 145 are received by a web server 142. The web server 142 receives a request, for example, from a computing device 148a, 148b, 148c, or 148d (generally 148) through a network 146. The request can be, for example, a request for information, and/or a request for access to a business application (e.g., retirement application, benefit application). The runtime files 145 process the request by responding with the requested information and/or by providing access to the business application. The access to the business application can be, for example, to allow the user 112 to interact with the business application to obtain, update, and/or add information associated with the business application. An advantage is that the platform independent runtime files 145 allow the business applications to be used across multiple computing platforms. Another advantage is that the runtime files 145 can be generated based on each customer's requirements which allows for business applications to be customized for each customer's business processes and data.

In other examples, the runtime files 145 include test files. The test files can include, for example, information associated with the business application that can be utilized to test the inputs and outputs of the business application and/or executable test files. The executable test files include, for example, methods to test the inputs and outputs of the business application. Another advantage is that the test files are generated for the business application which enables the testing to reflect the inputs and outputs of the business application (e.g., XYZ Corp's employee benefit application) instead of a template for all business applications (e.g., generic employee application testing method).

In some examples, the input files 118 include information associated with a business service application. In other examples, the runtime files 145 are associated with a business service application. The runtime files 145 can be, for example, the business service application. In some examples, the runtime files 145 are integrated with other executable files to form the business service application. The business service application can be, for example, a human resource application, an employee benefit application, an employee retirement application, a payroll application, and/or any other type of business service application.

The input files 118 can be, for example, an extensible markup language (XML) file, a human resource extensible markup language (HR-XML) file, an XML schema definition (XSD) file, an extensible stylesheet language transformations (XSLT) file, any other type of information file, and/or any other type of definition file. In some examples, the input files 118 include a service operation information file, a mapping information file, a schema file that defines the format of the service operation information file, and/or a schema file that defines the mapping information file. The service operation information file and mapping information file can be, for example, in HR-XML format.

The service operation information file can include, for example, operation definitions for mapping input data, request information for each operation definition, and/or response information for each operation definition. The mapping information file can include, for example, one or more mapping fields for mapping input data and/or one or more mapping logic operations for mapping input data. For example, the mapping information file can contain information that defines the mapping between the internal format and the standard format. The schema file that defines the formation of the service operation information file can include, for example, one or more data elements associated with input data for return.

The build time generation module 117 can determine, for example, if the service operation information file corresponds to the format as defined in the service operation information file. The build time generation module 117 can determine, for example, if the mapping information file corresponds to the format as defined in the payload schema file.

The runtime files 145 can be, for example, a Java executable file, a Java class file, an XML file, an XSLT file, a web service description language (WSDL) file, a Java archive (JAR) file, other types of platform independent executable files, and/or other types of platform independent class files. Another advantage to the mapping data on a network is that the use of platform independent executable and library files allows for the executables to be utilized on a wide range of computer systems without requiring a separate executable for each computer system.

In other examples, the runtime files 145 includes a query information file, a business services definition information file, one or more platform independent executable files, and/or one or more platform independent service class files. In some examples, the query information file is an XML file, the business services definition file is a WSDL file, the platform independent executable files are Java executable files, and the platform independent service class files are Java class files. The query information file can be used, for example, to control how data is transmitted and retrieved from the data server (not shown).

In other examples, the runtime files 145 include a web services description language information file that is generated based on the service operation information file. The runtime files 145 can include, for example, a test driver file and/or a test driver information file. In some examples, the test driver file is a Java executable file that includes software executable to test the requests and responses of the Java executable files and the Java service class files.

In some examples, the computer system 115 includes a library of input files and the user 112 selects input files from the library for use by the build time generation module 117. In other examples, the computer system 115 includes a library of schemas. For example, the user inputs the information files (e.g., service operation information file, mapping information file) and selects schemas from the library of schemas for use by the build time generation module.

In other examples, the request is a request for data or a request to modify data. The modification of data includes, for example, additions, subtractions, and/or revisions of data. The request can be, for example, associated with a business service application (e.g., the request is for payroll history data through an employee service web application). In other examples, the information associated with a request is in HR-XML format. The request can be, for example, transmitted and/or received using simple object access protocol (SOAP). The transmission and receiving of the request and the response from the request can be, for example, transmitted using SOAP over hypertext transfer protocol (HTTP) and/or HTTPS. Another advantage to the mapping of data on a network is the transfer of data over a network is using a standard protocol which allows for a wide variety of computer systems to access the data.

In some examples, the internal format is a proprietary format associated with an internal data server, world wide information module (WIM) format, and/or a data format based on nodes organized in a hierarchical association. For example, the data format based on nodes organized in a hierarchical association can be organized by data structures, then by data sections, and then by data items. The data structures are grouped where the data can be represented uniquely using the same type of key (e.g., XX). The data sections are organizations of small groups of items which are coherent and inseparable. The data items are the fields that contain the data and are at the bottom of the hierarchical association.

In other examples, the standard format is XML, HR-XML, and/or any other type of standard format. HR-XML is an extensible markup language standard utilized to represent HR indicative data. The data server (not shown) can be, for example, a storage device, a database server, and/or any other type of storage server. An advantage is that the standard format allows for the uniform access to the data that is stored which increases the value of the data because the data is more accessible and useable by the business organization.

Figure 2:
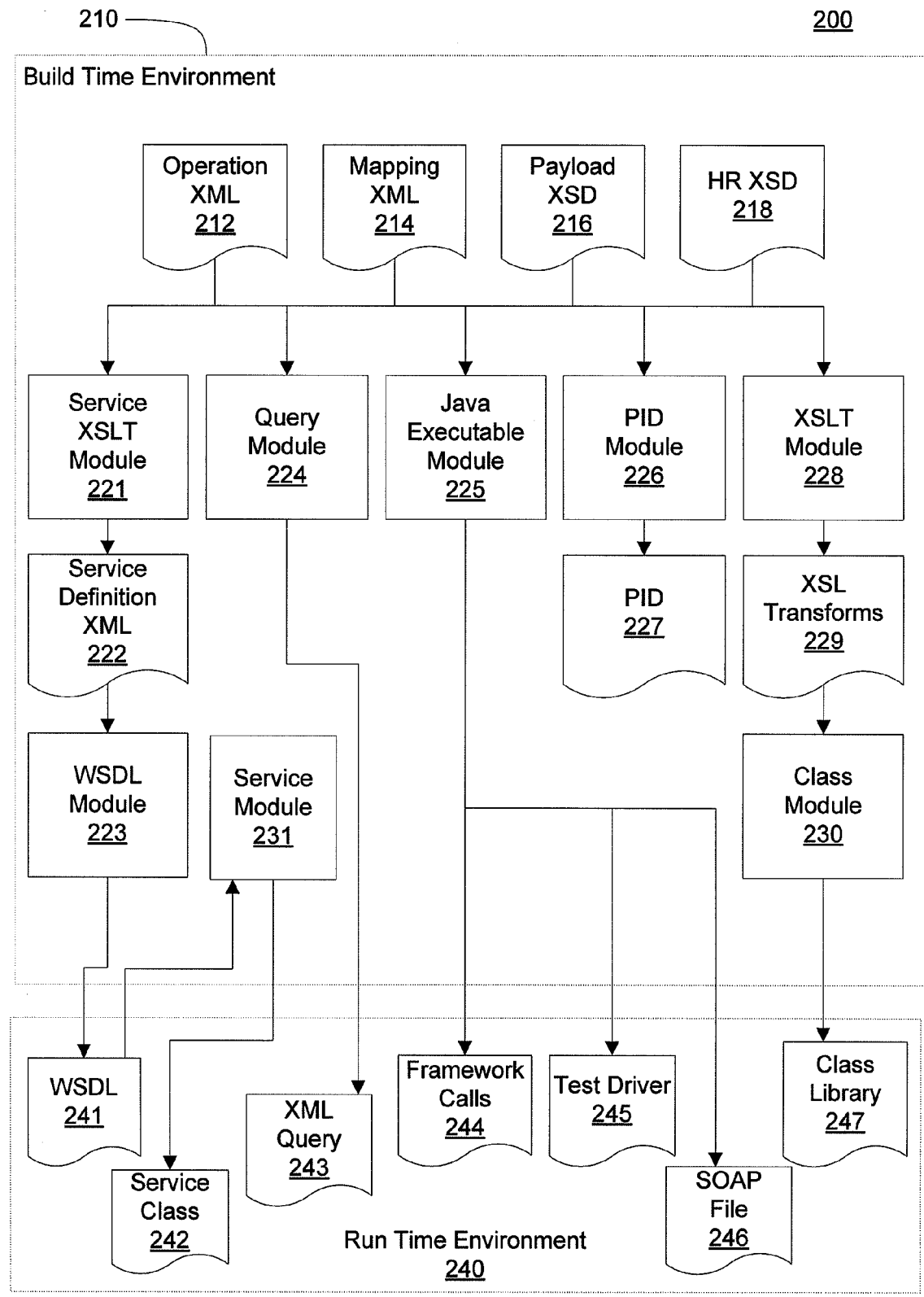
FIG. 2 is a block diagram of an exemplary system illustrating a plurality of input files that are utilized to generate a plurality of runtime files.

FIG. 2 is a block diagram of an exemplary system 200 illustrating a plurality of input files that are utilized to generate a plurality of runtime files. Referring to a build time environment 210, the input files include an operation XML file 212, a mapping XML file 214, a payload XSD file 216, and a HR XSD file 218. A service XSLT module 221 generates a service definition XML file 222 based on the operation XML file 212. A WSDL module 223 generates a WSDL file 241 based on the service definition XML file 222. A service module 231 generates a service class file 242 based on the WSDL file 241.

A query module 224 generates an XML query file 243 based on the operation XML file 212 and the mapping XML file 214. A Java executable module 225 generates a framework calls file 244, a test driver file 245, and a SOAP file 246 based on the operation XML file 212, the mapping XML file 214, the payload XSD file 216, and the HR XSD file 218.

A PID module 226 generates a protocol interface definitions (PID) file 227 (also known as an interface documentation file) based on the operation XML file 212, the mapping XML file 214, the payload XSD file 216, and the HR XSD file 218. An XSLT module 228 generates an XSL transforms file 229 based on the operation XML file 212, the mapping XML file 214, the payload XSD file 216, and the HR XSD file 218. A class module 230 generates a class library 247 based on the XSL transforms file 229. Another advantage to the generating code on a network is the input files can be modified for the requirements to organizations which allows for customized business applications to be generated for each organization.

In other examples, the query module 224 receives information associated with a backend server (not shown). The information can be, for example, metadata associated with the data structures of stored data. The backend server can be, for example, an internal data server that includes the stored data and/or an internal data server associated with the processing of data. In some examples, the query module 224 generates the XML query file 243 based on the operation XML file 212, the mapping XML file 214, and the information associated with the backend server. An advantage is that the information associated with the backend server is communicated during the generation of the runtime files instead of during the execution of the runtime files.

In some examples, the format module (not shown) determines if the operation XML file 212 and the mapping XML file 214 corresponds to the format as defined in the payload XSD file 216 and/or the HR XSD file 218. The format module can validate, for example, the operation XML file 212 and the mapping XML file 214 to check that the files correspond to the format as defined in the payload XSD file 216 and/or the HR XSD file 218. An advantage is that the operation XML file 212 and the mapping XML file 214 are validated before the generation of the runtime files to ensure that the input files comply with the format of the payload XSD file 216 and the HR XSD file 218.

The operation XML file 212 can include, for example, operation definitions for mapping input data (e.g., <operation name="GetFederalW4" . . . >), request information for each operation definition (e.g., <request message="stdRequestMsg"/>), and/or response information for each operation definition (e.g., <response message="GetFederalW4Msg"/>). The operation XML file 212 can provide, for example, the operational information associated with a business service application. An advantage is that operation definitions for mapping input data can be quickly and efficiently updated and runtime files can be generated based on the updated operation definitions which allows for data to be retrieved and stored. Another advantage is that the operation XML file 212 defines the operation of a business service application for use during the mapping of data. Another advantage is that the operation XML file 212 can be updated for different business service operations.

The following is an example of the operation XML file 212:

```
<operation name="GetFederalW4" cp="UD0PA"
operationType="Get" dataContext="FederalW4"
transactionCode="FEDW4">
    <request message="stdRequestMsg"/>
    <response message="GetFederalW4Msg"/>
</operation>
<message name="GetFederalW4Msg">
    <element name="FederalW4Rule"/>
    <element name="FederalTaxAuthorityTaxRestrictionRule"/>
    <element name="WithholdingMethod"/>
</message>
```

The mapping XML file 214 can include, for example, one or more mapping fields for mapping input data (e.g., <DirectMap ref="FederalEndDate"/>; <Constant name="FederalTaxAuthority2" xpath="/XX/L4/IDTU" value="LII00000"/>) and/or one or more mapping logic operations for mapping input data (e.g., see exemplary mapping XML 214 below). In some examples, the mapping field is a mapping type and the mapping logic operations include information to map data between the internal format and the standard format.

In other examples, the mapping fields and/or the mapping logic operations are reusable between a plurality of service operations. An advantage is that the mapping XML file 214 can be utilized by multiple operation XML files to generate business applications. Another advantage is that the mapping definitions are separated from the operation descriptions.

In other examples, the set of mapping types include a value mapping type, a direct mapping type, a constant mapping type, a conditional mapping type, and/or a collection mapping type. The value mapping type can be, for example, associated with a lookup function. For example, 0 to male, 1 to female. The direct mapping type can be, for example, associated with a direct mapping between elements. For example, State=GA. The constant mapping type can be, for example, associated with a known value that is not given by the data (e.g., organizational ID, organizational tax ID). For example, the organizational tax ID is not given directly in the data associated with an employee, but the organization is known from the data associated with the employee, so the organizational tax ID can be determined.

The conditional mapping type can be, for example, associated with rules and conditions. For example, if city=New York City, then city income tax=Yes. The conditional mapping type can be, for example, the creation of an element in a node based on a value, a rule, and/or a condition. The collection mapping type can be, for example, associated with multiple repetitive mappings. For example, if the employee's city of residence is New York City, then the Federal W4 city of residence will be New York City and the State W4 city of residence will be New York City. The multiple repetitive mappings can be, for example, used to process a set of data across a plurality of data sets. For example, a multiple repetitive mapping can be utilized to process W4 tax information for a plurality of employees for a company. Another advantage to the mapping data on a network is that the mapping types can be utilized to map different types of data between the internal format and the standard format.

The following is an example of the mapping XML file 214:

```
<Rule name="FederalW4Rule">
    <Request>
    <Case>
        <Test xpath="$CurrentNode" op="eq" value="W4"/>
        <Constant name="FederalTaxAuthority2" xpath="/XX/L4/IDTU"
value="LII00000"/>
        <Constant name="FederalTaxFormula" xpath="/XX/L4/IDTF"
value="01"/> <!--* Xpath illustrates the location of the data per the data structure (e.g.,
XX), data sections (e.g., L4), and data items (e.g., IDTF) -->
        <DirectMap ref="FederalStartDate"/>
        <DirectMap ref="FederalEndDate"/>    <!--* Illustrates the mapping
```

```
-continued logic for the direct mapping type-->
        <DirectMap ref="FederalW4Allowances"/>
        <DirectMap ref="FederalW4FilingMaritalStatus"/>
        <DirectMap ref="FederalW4AdditionalAmountToWithhold"/>
        <DirectMap ref="FederalTaxKeyMapId"/>
        <DirectMap ref="FederalTaxKeyVersion"/>
        <LookupTable ref="FederalW4Exempt"/> <!--* Illustrates the mapping
logic for the value mapping type (e.g., lookup function) -->
        <LookupTable ref="FederalTaxU4dmCode"/>
        <LookupTable ref="FederalTaxUpdateMode"/>
    </Case>
  </Request>
  <Response>
    <Case>
        <Test xpath="/XX/L4/IDTU" op="eq" value="LII00000"/>
        <DirectMap ref="FederalStartDate"/>
        <DirectMap ref="FederalEndDate"/>
        <DirectMap ref="FederalW4Allowances"/>
        <DirectMap ref="FederalW4FilingMaritalStatus"/>
        <DirectMap ref="FederalW4AdditionalAmountToWithhold"/>
        <LookupTable ref="FederalW4Exempt"/>
    </Case>
  </Response>
</Rule>
```

The payload XSD file 216 can define, for example, the payload of each service call (e.g., <xsd:element name="GetFederalW4Detail" type="this:GetFederalW4DetailType" minOccurs="1" maxOccurs="unbounded"/>). An advantage to the payload XSD file 216 is that the transactions can be defined for each business service application allowing for customized service calls for the business service application.

The following is an example of the payload XSD file 216:

The HR XSD file 218 can define, for example, the HR-XML schema (e.g., <xsd:simpleType name="PlanTypeEnum">) used for the standard format. An advantage of the HR XSD file 218 is that the standard schema can be utilized for a plurality of business service applications.

The following is an example of the HR XSD file 218:

```
<xsd:element name="GetFederalW4" type="this:GetFederalW4Type" />
<xsd:element name="GetFederalW4Response" type="this:GetFederalW4ResponseType" />
<xsd:element name="SetFederalW4" type="this:SetFederalW4Type" />
<xsd:element name="SetFederalW4Response" type="this:SetFederalW4ResponseType" />
<xsd:complexType name="GetFederalW4Type">
  <xsd:complexContent>
    <xsd:extension base="commonschema:StdGetRequestType">
      <xsd:sequence>
        <xsd:element name="GetFederalW4Detail" type="this:GetFederalW4DetailType"
minOccurs="1" maxOccurs="unbounded" />
      </xsd:sequence>
    </xsd:extension>
  </xsd:complexContent>
</xsd:complexType>
...
<xsd:complexType name="GetFederalW4DetailType">
  <xsd:sequence>
    <xsd:element name="GetFederalW4Payload" type="this:GetFederalW4PayloadType" />
  </xsd:sequence>
</xsd:complexType>
<xsd:complexType name="GetFederalW4PayloadType">
  <xsd:sequence>
    <xsd:element name="EmployeeId" type="hrxml:EntityIdType" minOccurs="1"
maxOccurs="1" />
    <xsd:element name="OrganizationId" type="xsd:string" minOccurs="0"
maxOccurs="1" />
  </xsd:sequence>
</xsd:complexType>
```

```xml
<xsd:simpleType name="PlanTypeEnum">
    <xsd:restriction base="xsd:string">
    <xsd:enumeration value="401k"/>
    <xsd:enumeration value="403b"/>
        <xsd:enumeration value="408k"/>
    <xsd:enumeration value="419"/>
    <xsd:enumeration value="457"/>
    <xsd:enumeration value="457f"/>
    <xsd:enumeration value="501c"/>
    <xsd:enumeration value="Pension"/>
    <xsd:enumeration value="Medical"/>
    <xsd:enumeration value="Dental"/>
    <xsd:enumeration value="Vision"/>
    <xsd:enumeration value="Life"/>
        <xsd:enumeration value="Health Care FSA"/>
    <xsd:enumeration value="Dependent Care FSA"/>
    </xsd:restriction>
</xsd:simpleType>
<xsd:complexType name="HRPersonalInformationType">
 <xsd:complexContent>
  <xsd:extension base="PersonalInformationType">
   <xsd:sequence>
    <xsd:element name="PreferredGivenName" type="xsd:string" minOccurs="0"/>
    <xsd:element name="PriorName" type="PersonNameType" minOccurs="0" maxOccurs="unbounded"/>
    <xsd:element name="NonLegalMaritalStatus" type="xsd:string" minOccurs="0"/>
    <xsd:element name="LanguageSkill" type="LanguageSkillType" minOccurs="0" maxOccurs="unbounded"/>
    <xsd:element name="EducationHistory" type="EducationHistoryType" minOccurs="0"/>
    <xsd:element name="License" type="LicenseAndCertificateType" minOccurs="0" maxOccurs="unbounded"/>
    <xsd:element name="Certificate" type="LicenseAndCertificateType" minOccurs="0" maxOccurs="unbounded"/>
    <xsd:element name="MilitaryInfo" type="MilitaryHistoryType" minOccurs="0" maxOccurs="unbounded"/>
    <xsd:element name="Vehicle" type="VehicleType" minOccurs="0" maxOccurs="unbounded"/>
    <xsd:element name="BirthLocation" type="PostalAddressType" minOccurs="0"/>
    <xsd:element name="EmergencyContact" type="EmergencyContactType" minOccurs="0" maxOccurs="unbounded"/>
    <xsd:element name="OfficialDocument" type="OfficialDocumentType" minOccurs="0" maxOccurs="unbounded"/>
    <xsd:element name="ExternalEmploymentHistory" type="ExternalEmploymentHistoryType" minOccurs="0" maxOccurs="unbounded"/>
    <xsd:element name="UserArea" type="UserAreaType" minOccurs="0"/>
   </xsd:sequence>
  </xsd:extension>
 </xsd:complexContent>
</xsd:complexType>
```

The service definition XML file 222 includes, for example, information that defines the services (e.g., GetStateW4) that can be utilized by the runtime files. The information in the service definition XML file 222 includes, for example, header information, message information, error management information, and/or other types of information associated with the business services associated with the runtime files. The following is an example of part of a service definition XML file 222 generated by the service XSLT module 221 based on the operation XML file 212:

```xml
<!--Get StateW4-->
    <method name="GetStateW4"
    outputType="thisschema:GetStateW4Response"
    transactionCode="W4" comment="Get StateW4">
        <header name="context"
    message="servicecallcontext:ServiceCallContext" direction="inout"/>
        <header name="directives"
```

-continued

```xml
    message="serviceprocessingdirectives:ServiceProcessingDirectives"/>
        <fault name="HRPRWSFault"
        message="svccommon:HRPRWSFault"/>
        <fault name="HRPRWSInternalServiceFault"
        message="svccommon:HRPRWSInternalServiceFault"/>
        <fault name="HRPRWSAuthenticationFault"
        message="svccommon:HRPRWSAuthenticationFault"/>
    </method>
```

Although the exemplary system 200 includes one XSL transforms file 229, the XSLT module 228 can generate one or more XSL transforms files. The XSL transforms files 229 can be, for example, used to perform the mapping of the data bi-directionally between the internal format (e.g., WIM) and the standard format (e.g., HR-XML). The XSL transforms files 229 can have, for example, an XSL transforms file (e.g., 229) for a request from a user and an XSL transforms file (e.g., 229) for a response to a user. In some examples, the plurality of XSL transforms files (e.g., 229) that are generated for all of the responses and requests are compiled into a library of Java class files. The XSL transforms file 229 defines, for example, how a request and/or a response is processed by the runtimes files. The XSL transforms file 229 defines, for example, the input and/or output information associated with a request and/or a response. For example, the XSL transforms file 229 includes information locating data in the internal format (e.g., //WIM/LL/NodeMM/ID) to map the data to the standard format (e.g., GetFederalW4Payload/this:EmployeeId/hrxml:IdName).

The following is an example of part of a XSL transforms file 229 generated by the XSLT module 228 based on the operation XML file 212, the mapping XML file 214, the payload XSD file 216, and the HR XSD file 218:

```
<xsl:element name="WIM">
 <xsl:element name="LL">
  <xsl:element name="NodeMM">
   <xsl:element name="ID">
    <xsl:choose>
     <xsl:when test="(/this:GetFederalW4Payload/
this:EmployeeId/hrxml:IdName = 'SSN')">
      <xsl:value-of
select="/this:GetFederalW4Payload/this:EmployeeId/hrxml:IdValue" />
     </xsl:when>
    </xsl:choose>
   </xsl:element>
  </xsl:element>
  <xsl:element name="Node11">
   <xsl:element name="CCE">
    <xsl:value-of
```

-continued

```
select="/this:GetFederalW4Payload/this:OrganizationId" />
   </xsl:element>
   <xsl:element name="DOSS">
    <xsl:choose>
     <xsl:when test="(/this:GetFederalW4Payload/
this:EmployeeId/hrxml:IdName = 'DOSS')">
      <xsl:value-of
select="/this:GetFederalW4Payload/this:EmployeeId/hrxml:IdValue" />
     </xsl:when>
    </xsl:choose>
   </xsl:element>
   <xsl:element name="MAET">
    <xsl:choose>
     <xsl:when test="(/this:GetFederalW4Payload/
this:EmployeeId/hrxml:IdName = 'MAET')">
      <xsl:value-of
select="/this:GetFederalW4Payload/this:EmployeeId/hrxml:IdValue" />
     </xsl:when>
    </xsl:choose>
   </xsl:element>
  </xsl:element>
</xsl:element>
```

In some examples, the XML query file 243 is used in the runtime environment to specify how data is sent to and received from a data server. The XML query file 243 can include, for example, information that defines inputs, outputs, and/or the operations of a particular operation. The following is an example of part of a XML query file 243 generated by the service query module 224 based on the operation XML file 212 and the mapping XML file 214:

```
<?xml version="1.0" encoding="UTF-8"?>
<querySpecifier cp="LL0PA" dataContext="FederalW4" fac="DEFAULT"
maxDossier="100" name="WIM" serviceName="EmployeeTax"
transactionCode="FEDW4" xmlns:xsi=http://www.w3.org/2001/XMLSchema-instance>
    <dataStructure dossierType="SAL" isSummarySupported="true" name="LL"
overrideMode="None">
        <dataSection ihrType="0" name="00" overrideMode="None"
queryonly="true" updateType="Regular">
            <dataItem dateType="NotADate" ihrFlag="38" ihrRole="0" ihrType="2"
key="true" name="MAET" overrideMode="None" redefineType="NA"/>
            <dataItem dateType="NotADate" name="DOSS" overrideMode="None"
readOnly="true" redefineType="NA"/>
            <dataItem dateType="NotADate" ihrFlag="38" ihrRole="0" ihrType="2"
key="true" name="SOCCLE" overrideMode="None" redefineType="NA"/>
        </dataSection>
        <Selections>
        <Selection name="empid" overrideMode="None" rank="0">
            <Select>{$/WIM/LL/NodeMM/DOSS$}</Select>
                <Case name="empid">
                <Test op="not empty"
xpath="/WIM/LL/NodeMM/DOSS"/>
                </Case>
        </Selection>
            <Selection name="ssnorgid" overrideMode="None" rank="1">
                <Select>select a.nudoss from zy00 a, zyuu b where
a.nudoss = b.nudoss and b.idussn = '$/WIM/LL/NodeMM/ID$' and a.soccle =
'$/WIM/LL/NodeMM/SOC$'</Select>
                <Case name="casessnorgid">
                    <Test op="empty"
xpath="/WIM/LL/NodeMM/CLE"/>
                    <Test op="not empty"
xpath="/WIM/LL/NodeMM/ID"/>
                    <Test op="not empty"
xpath="/WIM/LL/NodeMM/CLE"/>
                </Case>
            </Selection>
        </Selections>
    </dataStructure>
</querySpecifier>
```

In some examples, the WSDL file 241 is the interface specification for the business services generated by the runtime files. The following is an example of part of a WSDL file 241 generated by the service WSDL module 223 based on the service definition XML file 222:

```
<!-- * Messages -->
<!--Get FederalW4-->
<wsdl:message       xmlns:wsdl=http://schemas.xmlsoap.org/wsdl/
name="getFederalW4Request">
<wsdl:documentation>Request: Get FederalW4</wsdl:documentation>
<!--SOAP Header part-->
<wsdl:part name="context"
element="servicecallcontext:ServiceCallContext" />
<!--SOAP Header part-->
<wsdl:part                              name="directives"
element="serviceprocessingdirectives:ServiceProcessingDirectives" />
<!--SOAP Header part-->
<wsdl:part name="head" element="head:Head" />
<!--SOAP Body part-->
<wsdl:part name="params" element="thisschema:GetFederalW4" />
</wsdl:message>
<wsdl:message xmlns:wsdl=http://schemas.xmlsoap.org/wsdl/
name="getFederalW4Response">
<wsdl:documentation>Response: Get FederalW4</wsdl:documentation>
<!--SOAP Header part (inout)-->
<wsdl:part name="context"
element="servicecallcontext:ServiceCallContext" />
<wsdl:part name="params"
element="thisschema:GetFederalW4Response" />
</wsdl:message>
<!-- * Port -->
<!--Get FederalW4-->
<wsdl:operation name="getFederalW4"parameterOrder="context
directives head params">
<wsdl:documentation>Get FederalW4</wsdl:documentation>
<wsdl:input              message="this:getFederalW4Request"
name="getFederalW4Request" />
<wsdl:output             message="this:getFederalW4Response"
name="getFederalW4Response" />
<wsdl:fault name="HRPRWSFault"
message="svccommon:HRPRWSFault" />
<wsdl:fault              name="HRPRWSInternalServiceFault"
message="svccommon:HRPRWSInternalServiceFault" />
<wsdl:fault              name="HRPRWSAuthenticationFault"
message="svccommon:HRPRWSAuthenticationFault" />
</wsdl:operation>
<!--* Operations (Bindings) -->
<wsdl:binding         xmlns:wsdl=http://schemas.xmlsoap.org/wsdl/
name="EmployeeTaxSoapBinding" type="this:EmployeeTax">
<wsdlsoap:binding    xmlns:wsdlsoap=http://schemas.xmlsoap.-
org/wsdl/soap/
style="document" transport="http://schemas.xmlsoap.org/soap/http" />
```

The following is an example of part of a SOAP file 246 generated by the Java executable module 225 based on the operation XML file 212, the mapping XML file 214, the payload XSD file 216, and the HR XSD file 218:

```
package com.hrpr.ws.employeetax.gen.service;
public class EmployeeTaxSoapBindingImpl extends
com.hrpr.ws.employeetax.impl.EmployeeTaxImpl { }
```

The following is an example of part of a test driver file 245 generated by the Java executable module 225 based on the operation XML file 212, the mapping XML file 214, the payload XSD file 216, and the HR XSD file 218:

```
public void executeTests( )
    throws Exception {
        HRAQryContext context = frameworktest.getContext( );
        if ((operation == null) || operation.equals("GetFederalW4")) {
            context.setDataContext("FederalW4");
        frameworktest.getData("GetFederalW4", testcaseId, context);
        }
        frameworktest.disconnect( );
    }
```

The framework calls file 244 can be, for example, a Java executable file. In some examples, the framework calls file 244 includes software executable to process the XML query file 243 (e.g., load for use in the mapping). The framework calls file 244 includes, for example, software executable to map the data in the standard format (e.g., HRXML SOAP element) to data in the internal format (e.g., WIM DOM element) on a request from the user and to map the data in the internal format to data in the standard format on the response to the user. The following is an example of part of a framework calls file 244 generated by the Java executable module 225 based on the operation XML file 212, the mapping XML file 214, the payload XSD file 216, and the HR XSD file 218:

```
public GetFederalW4ResponseType getFederalW4(params)throws
HRPRWSAuthenticationFault, HRPRWSInternalServiceFault {
    SOAPElement[ ] requestPayload = null;
    final GetFederalW4DetailType[ ] details = params.getGetFederalW4Detail( );
    final GetFederalW4ResponseType response = new
GetFederalW4ResponseType( );
        try {
            final List nudossList = new ArrayList( );
            Boolean processAsBatch = false;
            if (params.isSummary( ) == true) {
                setJaMonTimerLabel(EmployeeTaxImpl.SERVICE +
".GetFederalW4Summary.totalTime");
            }else{
                ...
            }
            ...
            HRAQryContext hraContext = new HRAQryContext( );
            hraContext.setServiceName(EmployeeTaxImpl.SERVICE);
            hraContext.setDataContext("FederalW4");
            hraContext.setOperationName("GetFederalW4");
            response.setGetFederalW4ResponseDetail(new
```

-continued

```
            GetFederalW4ResponseDetailType[details.length]);
                ...
                final SoapResponse soapResponse = new SoapResponse( );
                final ResponseMsgs responses = getData(hraContext,
requestPayload, soapResponse);
                responseDetail.setResponseMsgs(responses);
                responseDetail.set_any(soapResponse.getSoapElements( ));
                responseDetail.setTimestamps(hraContext.getDsTimestamps( ));
                response.setGetFederalW4ResponseDetail(i, responseDetail);
            }
```

The PID file 227 can provide, for example, information regarding the request and response calls to the executable files. An advantage of the PID file 227 is that it is automatically generated based on the input files to reduce the errors associated with manually created files. Another advantage is that the PID file 227 describes the input, output, and processing of the available business application services in a human readable form. The following table 1 is an exemplary PID file 227 generated by the PID module based on the operation XML file 212, the mapping XML file 214, the payload XSD file 216, and the HR XSD file 218:

using the Java service class module 346 maps the data from the internal interface format 349 to a standard interface format 348. The mapping includes utilizing at least one mapping type. The mapping types include a value mapping type, a direct mapping type, a constant mapping type, a conditional mapping type, and/or a collection mapping type. The data in the standard interface format 348 is returned to the web server 342 which returns the data in the standard interface format 348 to the user 305 through the user's computing device 310.

If data needs to be added to or updated, then the web server 342 transmits the data in the standard interface format 348 to

TABLE 1

Examplary PID File
Request: GetFederalW4
Request Tag: <GetFederalW4>

|  | Min | Max | Usage | Key |
|---|---|---|---|---|
| Argument 1 |  |  |  |  |
| /commonschema:AsOfDate | 0 | 1 | optional |  |
| Argument 2 |  |  |  |  |
| /commonschema:Summary | 1 | 1 | required |  |
| Argument 3 |  |  |  |  |
| /this:GetFederalW4Detail | 1 | n | required |  |
| /this:GetFederalW4Detail/this:GetFederalW4Payload | 0 | 1 | optional |  |
| /this:GetFederalW4Detail/this:GetFederalW4Payload/this:EmployeeId | 1 | 1 | required |  |
| /this:GetFederalW4Detail/this:GetFederalW4Payload/this:EmployeeId/hrxml:IssuingAuthority | 1 | 1 | required |  |
| /this:GetFederalW4Detail/this:GetFederalW4Payload/this:EmployeeId/hrxml:IdName | 1 | 1 | required |  |
| /this:GetFederalW4Detail/this:GetFederalW4Payload/this:EmployeeId/hrxml:IdValue | 1 | 1 | required | * |
| /this:GetFederalW4Detail/this:GetFederalW4Payload/this:OrganizationId | 0 | 1 | optional |  |

Figure 3:
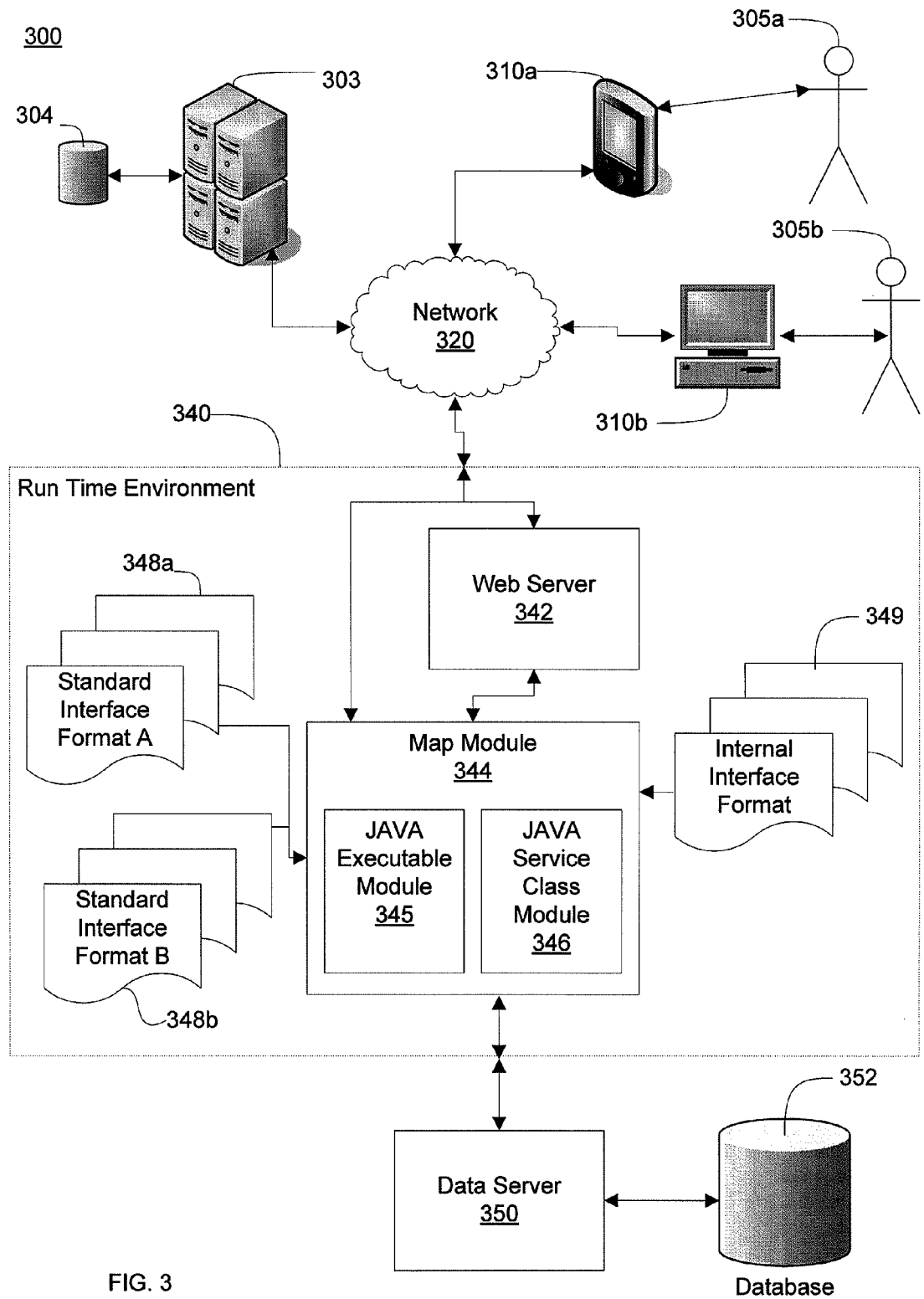
FIG. 3 is a functional block diagram of an exemplary system illustrating mapping of data between a standard format and an internal format.

FIG. 3 is a functional block diagram of an exemplary system 300 illustrating mapping of data between a standard interface format 348a and 348b (generally 348) and an internal interface format 349. A user 305a or 305b (generally 305) utilizing a computing device 310a or 310b (generally 310) communicates a request to a web server 342 through a network 320. The web server 342 processes the request and determines if data needs to be retrieved from a data server 350 or if data stored by the data server 350 needs to be added to or updated. Requests are transmitted from a computer system 303 to the web server 342 for processing. The computer system 303 includes a storage device 304 that stores information associated with requests to the web server 342.

If data needs to be retrieved from the data server 350, then the web server 342 requests the data from a map module 344. The map module 344 includes a Java executable module 345 and a Java service class module 346. The map module 344 requests the data from the data server 350. The data server 350 communicates with a database 352 to retrieve the data. The map module 344 receives the data in an internal interface format 349 (e.g., format associated with a database management system (DBMS)). The Java executable module 345 the map module 344. The Java executable module 345 utilizing the Java service class module 346 maps the data from the standard interface format 348 to the internal interface format 349 utilizing at least one mapping type. The data in the internal interface format 349 is received by the data server 350 and the data is added to the database 352 or is utilized to update existing data in the database 352.

Although the exemplary system 300 includes two standard interface formats 348a and 348b, the exemplary system 300 can utilize, for example, one standard interface format. The exemplary system 300 can utilize, for example, more than two standard interface formats (e.g., three, five, ten, twenty). Although the exemplary system 300 includes one internal interface format 349, the exemplary system 300 can utilize, for example, more than one internal interface format (e.g., two, five, ten, twenty).

In some examples, the database 352 is a network attached storage device, a redundant array of independent disks (RAID) array associated with the data server 350, a database 352 utilizing a relational database management system (RDBMS), and/or any other type of data storage device.

In some examples, the Java executable module 345 includes one or more Java executable bytecode files. The Java executable bytecode files can be, for example, platform independent files that are interrupted or compiled at runtime to machine code for execution. An advantage to the mapping data on the network is the platform independent executable files that are utilized to provide cross platform support for the mapping of data between internal formats and standard formats. In other examples, the computer system 303 transmits requests to the map module 344. The map module 344 can process the requests and return information associated with the request, if any, to the computer system 303.

For example, a user 305 (EmpoyeeID=3230) using a computing device 310 make a request to update compensation benefit data as of Jan. 15, 2006. The request is processed by the web server 342 which determines that an update request for data should be sent to the map module 344. The map module 344 receives the update request for data and the Java executable module 345 processes the request. The Java executable module 345 calls classes associated with the Java service class module 346 to format the update request for data to the data server 350. The requested data is returned to the Java executable module 345 in the WIN DOM format which is illustrated by the following example:

```
<WIM>
    <XYZ> <!--* Illustrates the data structure which is grouped
according to the organization of the employee - XYZ Corporation-->
        <Node 3230> <!--* Illustrates the data sections which
is grouped by employee ID-->
            <DTSTART>2005-01-01</DTSTART>   <!--*
Illustrates the data items compensation start date-->
                <OT>1</OT>
                <SALARY>35000</SALARY>
                <RC>New York City</RC>
            </Node LL>
    </XYZ>
</WIM>
```

The Java executable module 345 maps the returned data using at least one mapping type selected from a set of mapping types. The mapped data is illustrated by the following example in a standard format:

```
<?xml version="1.0" encoding="UTF-8"?>
<this:CompensationPayload>
    <this:EmployeeID>
        <EmployerName>XYZ Corporation </EmployerName>
        <EmployerTaxID>3225223423</EmployerTaxID>    <!--*
Illustrates the constant data mapping because the data was not provided in the response
but it is data that is a known value-->
        <CompensationStartDate>01-01-2005</CompensationStartDate>
        <OverTimeEligible>Yes</OverTimeEligible>    <!--* Illustrates the
value mapping type because the value in the internal format is 1 and that value is mapped
to Yes-->
        <EmployeeSalary>35000</EmployeeSalary>    <!--* Illustrates the
direct mapping type since the salary was given in the internal format-->
        <ResidenceCity>New York City</ResidenceCity>
        <CityIncomeTax>Yes</CityIncomeTax>    <!--* Illustrates the
conditional mapping type because the residence city is known, New York City, which makes
the condition Yes that the employee has a city income tax-->
        ...
        <StateTaxCity>New York City</StateTaxCity>    <!--* Illustrates the
multiple repetitive mappings because once the employees residence is known then the
residence can be repeated -->
        ...
        <FederalTaxCity>New York City</FederalTaxCity>
    </this:EmployeeID>
</this:CompensationPayload>
```

Figure 4:
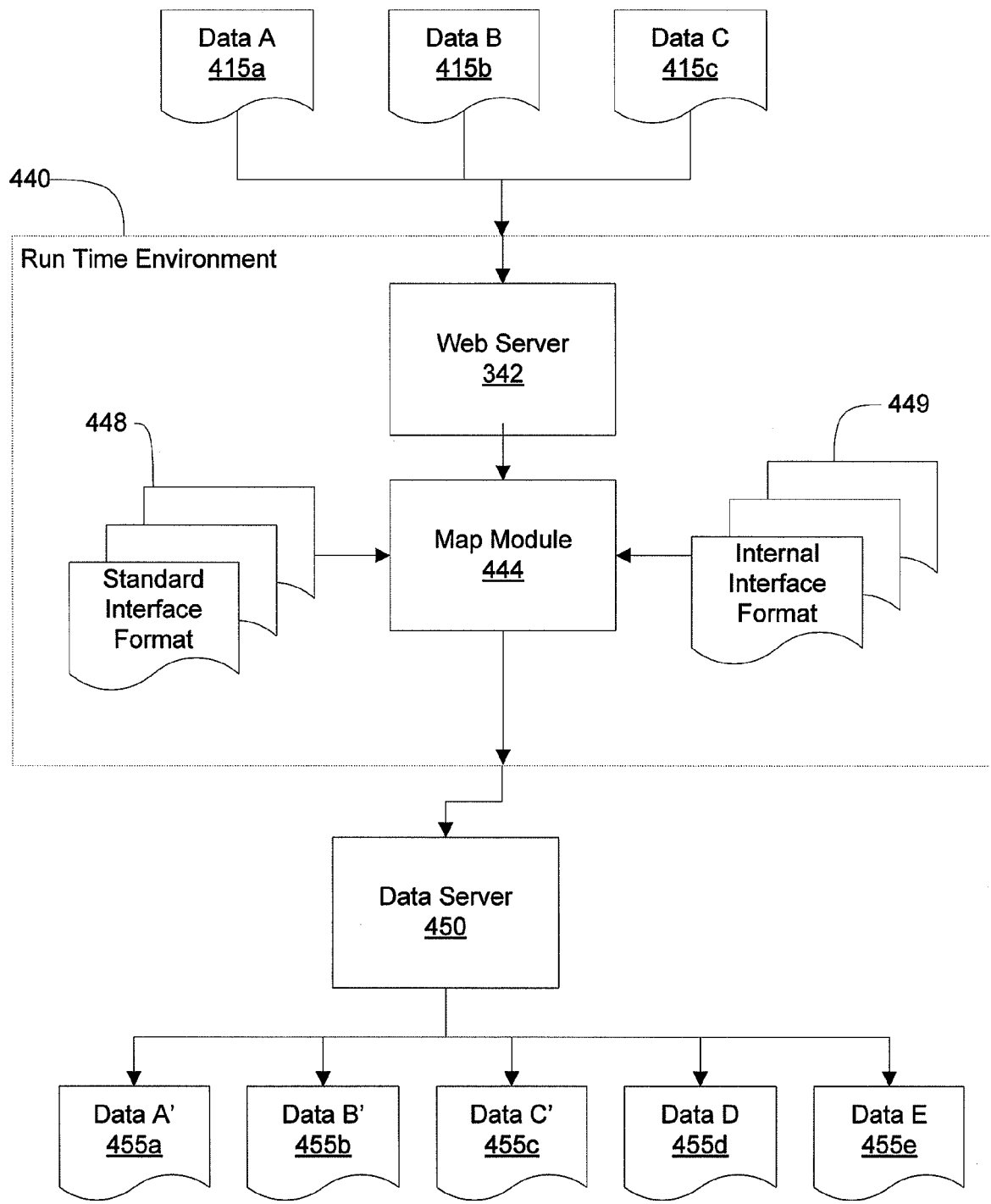
FIG. 4 is a block diagram of an exemplary system illustrating mapping of data between a standard format and an internal format.

FIG. 4 is a block diagram of an exemplary system 400 illustrating mapping of data between a standard interface format 448 and an internal interface format 449. The data A 415*a*, data B 415*b*, and data C 415*c* (generally 415) are received by a web server 342 included in a run time environment 440. The web server 342 processes the data 415 and transmits the data 415 to a map module 444. The map module 444 maps the data 415 utilizing the standard interface format 448 and the internal interface format 449. The data 415 in the standard interface format 448 is mapped to data A' 455*a*, data B' 455*b*, data C' 455*c*, data D 455*d*, and data E 455*e* (generally 455) in the internal interface format 449. The data 455 in the internal interface format 449 is received and stored by a data server 450.

For example, the user (not shown) inputs a request to add an employee to the organization. The request includes data A 415*a*, data B 415*b*, and data C 415*c* which follow:

```
Data A 415a
    <?xml version="1.0" encoding="UTF-8"?>
    <this:CompensationPayload>
        <this:EmployeeID>
            <EmployerName>XYZ Corporation</EmployerName>
            <EmployerTaxID>3225223423</EmployerTaxID>
        </this:EmployeeID>
    <this:CompensationPayload>
Data B 415b
    <?xml version="1.0" encoding="UTF-8"?>
    <this:CompensationPayload>
        <this:EmployeeIDStart>
            <StartDate>01-01-2005</CompensationStartDate>
            <OverTimeEligible>Yes</OverTimeEligible>
            <EmployeeSalary>35000</EmployeeSalary>
        </this:EmployeeIDStart>
    <this:CompensationPayload>
Data C 415c
    <?xml version="1.0" encoding="UTF-8"?>
    <this:CompensationPayload>
        <this:EmployeeIDTax>
            <ResidenceCity>New York City</ResidenceCity>
            <CityIncomeTax>Yes</CityIncomeTax>
            ...
            <StateTaxCity>New York City</StateTaxCity>
            ...
```

-continued

```
        <FederalTaxCity>New York City</FederalTaxCity>
    </this:EmployeeIDTax>
</this:CompensationPayload>
```

The map module 444 maps the data 415 from the standard interface format 448 to the internal interface format 449. The mapping includes utilizing at least one mapping type selected from the set of mapping types (e.g., direct mapping employee salary to the internal format /XYZ/Node 23/ESA). The following is an example of data A' 455a which is the data mapped into the internal format:

```
Data A' 455a
<WIM>
    <XYZ>
        <Node 23>
            <ESA>3225223423</ESA>
        </Node 23>
    </XYZ>
</WIM>
```

Figure 5:
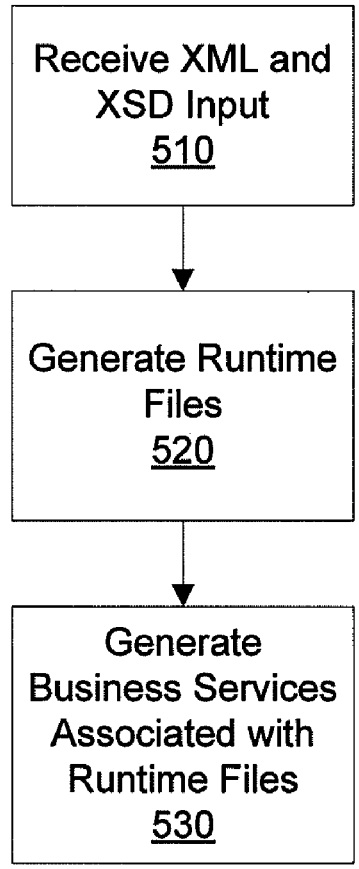
FIG. 5 is a flowchart diagram depicting the generation of a plurality of runtime files from a plurality of input files.

FIG. 5 is a flowchart diagram 500 depicting the generation of a plurality of runtime files 145 from a plurality of input files 118 through the exemplary system 100 of FIG. 1. The computer system 115 receives (510) the input files 118 from the user 112. The build time generation module 117 generates (520) runtime files 145 based on the input files 118. The runtime files 145 are received by the map module 144. The web server 142 and map module 144 generate (530) one or more business services associated with the runtime files 145.

Figure 6:
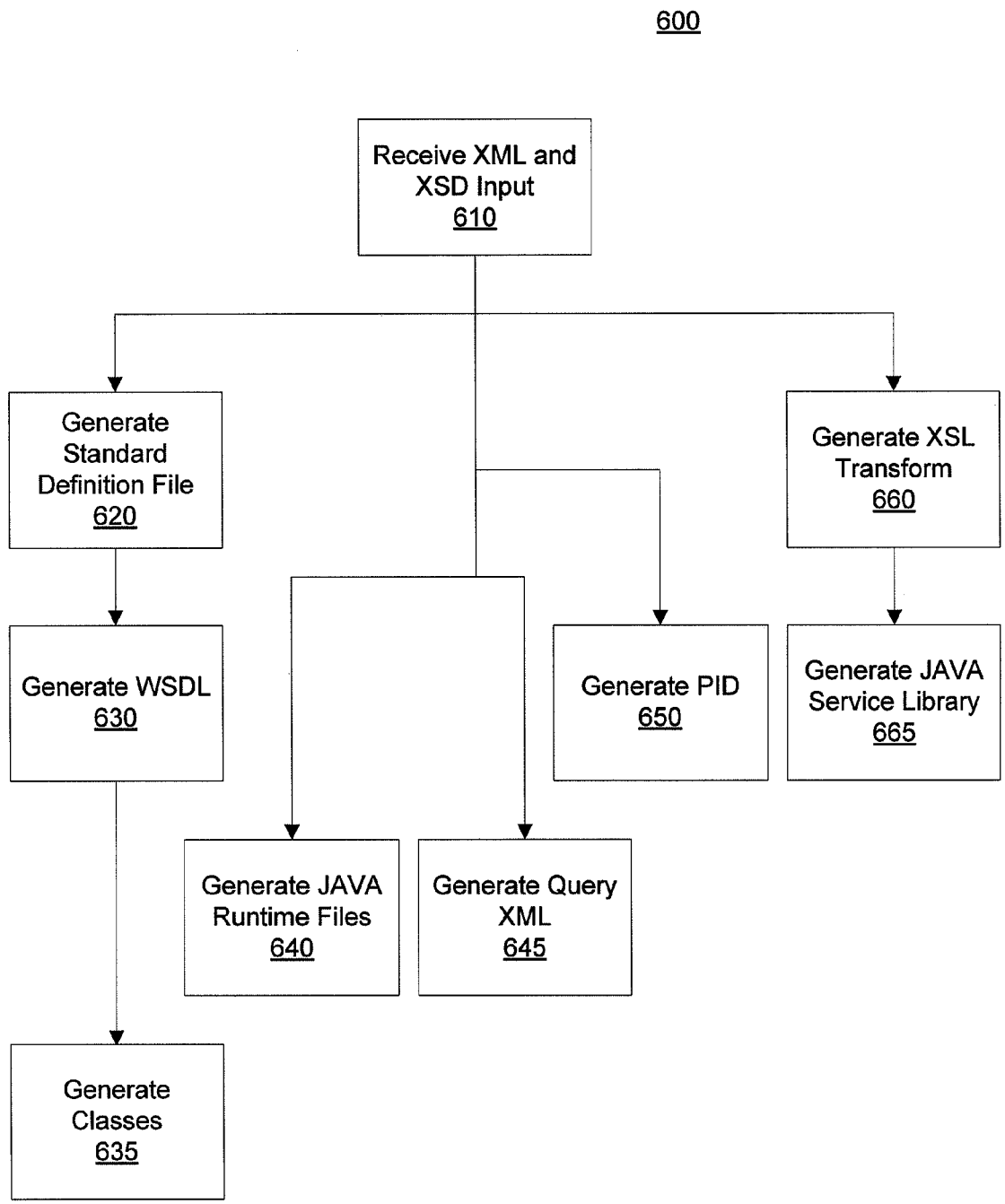
FIG. 6 is a flowchart diagram depicting the generation of a plurality of runtime files from a plurality of input files.

FIG. 6 is a flowchart diagram 600 depicting the generation of a plurality of runtime files from a plurality of input files through the exemplary system 200 of FIG. 2. Referring to the build time environment 210, the operation XML file 212, mapping XML file 214, payload XSD file 216, and HR XSD file 218 are received (610). The service XSLT module 221 generates (620) a service definition XML file 222 based on the operation XML file 212. The WSDL Module 223 generates (630) the WSDL file 241 based on the service definition XML file 222. The service module 231 generates (635) the service class file 242 based on the WSDL file 241.

The Java executable module 225 generates (640) Java runtime files (e.g., framework calls 244 and test driver 245) based on the operation XML file 212, the mapping XML file 214, the payload XSD file 216 and the HR XSD file 218. The query module 224 generates (645) the XML query file 243 based on the operation XML file 212 and the mapping XML file 214. The PID module 226 generates (650) the PID file 227 based on the operation XML file 212, the mapping XML file 214, the payload XSD file 216 and the HR XSD file 218. The XSLT module 228 generates (660) a XSL transforms file 229 based on the operation XML file 212, the mapping XML file 214, the payload XSD file 216 and the HR XSD file 218. The class module 230 generates (665) class library file 247 based on the XSL transforms file 229.

Figure 7:
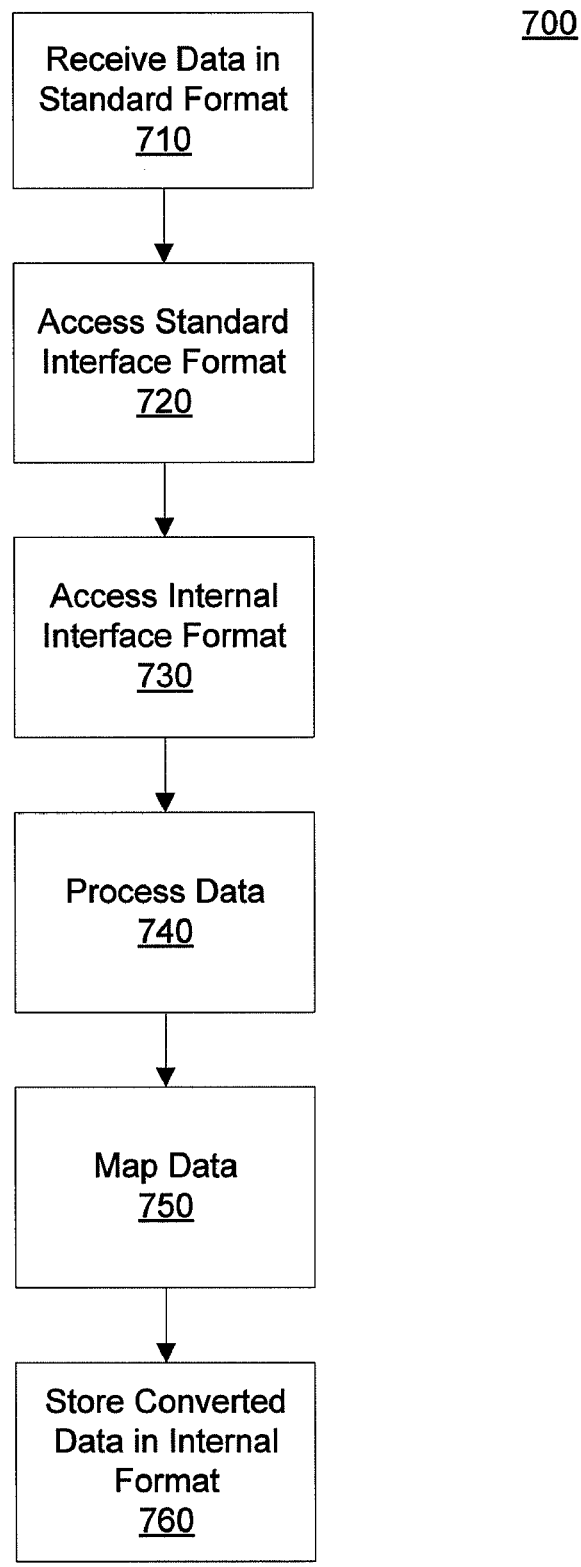
FIG. 7 is a flowchart diagram depicting the mapping of data between a standard format and an internal format.

FIG. 7 is a flowchart diagram 700 depicting the mapping of data between a standard format 348 and an internal format 349 through the exemplary system 300 of FIG. 3. The map module 344 receives (710) data in a standard format. The map module 344 accesses (720) the standard format 348a or 348b. The map module 344 accesses (730) the internal format 349. The map module 344 processes (740) the data. The map module 344 maps (750) the data from the standard format 348 to the internal format 349 using one or more mapping types selected from the set of mapping types. The map module 344 communicates with the data server 350 to store (760) the data in the internal format 349. The data in the internal format 349 is stored (760) in the database 352.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method of generating runtime files for mapping data between devices on a network, the method comprising:
   receiving, on a computer system, a plurality of input files comprising:
      a first input file comprising data associated with service operation information, the service operation information including an operation definition that maps input data and at least one of request information for the operation definition or response information for the operation definition,
      a second input file comprising data associated with mapping information, the mapping information including one or more mapping fields that map input data, one or more mapping logic operations for mapping input data, or any combination thereof,
      a third input file comprising a schema defining a format of the service operation information, and
      a fourth input file comprising a schema defining the format of the mapping information;
   generating, using a build time generation module processor on the computer system, a plurality of runtime files based on the plurality of input files for mapping data between devices, the plurality of runtime files comprising:
      a first runtime file comprising query information for controlling data exchange with a backend server,
      a second runtime file comprising business services definition information, the business services definition information defining associations with a business services application, and
      one or more executable files comprising platform independent executable files.

2. The computer-implemented method of claim 1, further comprising generating an interface documentation file comprising information associated with the business service application.

3. The computer-implemented method of claim 1, further comprising receiving information associated with the backend server.

4. The computer-implemented method of claim 3, wherein the generating the plurality of runtime files is further based on the information associated with the backend server.

5. The computer-implemented method of claim 1, further comprising determining if the first input file and the second input file corresponds to the format as defined in the third input file, the fourth input file, or any combination thereof.

6. The computer-implemented method of claim 5, wherein the determining comprises validating that the first input file and the second input file is in the format as defined in the third input file, the fourth input file, or any combination thereof.

7. The computer-implemented method of claim 1, wherein the plurality of runtime files further comprises a third runtime file comprising web services description language information based on the first input file.

8. The computer-implemented method of claim 1, wherein the plurality of runtime files further comprises one or more test files comprising a test driver, information associated with the test driver, or any combination thereof.

9. The computer-implemented method of claim 1, further comprising generating one or more business service applications associated with the runtime files.

10. The computer-implemented method of claim 1, further comprising processing requests to map data from an internal format to a standard format, to map data from the standard format to the internal format, or any combination thereof.

11. The computer-implemented method of claim 1, wherein the plurality of the input files comprise information associated with the business service application.

12. The computer-implemented method of claim 11, wherein the business service application is a human resource application, an employee benefit application, an employee retirement application, a payroll application, or any combination thereof.

13. The computer-implemented method of claim 1, wherein the first input file further comprises a second operation definition for mapping input data and at least one of request information for the second operation definition or response information for the second operation definition.

14. The computer-implemented method of claim 1, wherein the third input file further comprises a service definition defining one or more data elements associated with input data for return.

15. The computer-implemented method of claim 1, wherein the format of the mapping information is human resource extensible markup language (HR-XML).

16. The computer-implemented method of claim 1, wherein the platform independent executable files are Java executable files.

17. The computer-implemented method of claim 1, wherein the platform independent executable files are Java service class files.

18. The computer-implemented method of claim 1, wherein the query information is in extensible markup language (XML) format.

19. A computer program product, embodied in computer-readable storage medium, the computer program product including instructions being operable to cause a data processing apparatus to:
receive a plurality of input files comprising:
a first input file comprising data associated with service operation information, the service operation information including an operation definition that maps input data and at least one of request information for the operation definition or response information for the operation definition,
a second input file comprising data associated with mapping information, the mapping information including one or more mapping fields that map input data, one or more mapping logic operations for mapping input data, or any combination thereof,
a third input file comprising a schema defining a format of the service operation information, and
a fourth input file comprising a schema defining the format of the mapping information;
generate a plurality of runtime files based on the plurality of input files for mapping data between devices, the plurality of runtime files comprising:
a first runtime file comprising query information for controlling data exchange with a backend server,
a second runtime file comprising business services definition information, the business services definition information defining associations with a business services application, and
one or more executable files comprising platform independent executable files.

20. A system for generating runtime files for mapping data between devices on a network comprising:
a computing processor configured to:
receive a plurality of input files comprising:
a first input file comprising data associated with service operation information, the service operation information including an operation definition that maps input data and at least one of request information for the operation definition or response information for the operation definition,
a second input file comprising data associated with mapping information, the mapping information including one or more mapping fields that map input data, one or more mapping logic operations for mapping input data, or any combination thereof,
a third input file comprising a schema defining a formation of the service operation information, and
a fourth input file comprising a schema defining the format of the mapping information; and
generate a plurality of runtime files based on the plurality of input files for mapping data between devices, the plurality of runtime files comprising:
a first runtime file comprising query information for controlling data exchange with a backend server,
a second runtime file comprising business services definition information, the business services definition information defining associations with a business services application, and
one or more executable files comprising platform independent executable files.

21. The system of claim 20, wherein the plurality of runtime files further comprises a third runtime file comprising web services description language information based on the first input file.

22. The system of claim 20, wherein a WSDL module processor is configured to generate the third runtime file based on the first input file.

23. The system of claim 22, wherein a service module processor is configured to generate the one or more executable files based on the third runtime file.

24. The system of claim 20, wherein a query module processor is configured to generate the first runtime file based on the first input file.

25. The system of claim 20, wherein a platform independent executable module processor is configured to generate the one or more platform independent executable files based on the first input file, the second input file, the third input file, the fourth input file, or any combination thereof.

26. The system of claim 20, wherein a platform independent executable module processor is configured to generate one or more test files based on the first input file, the second input file, the third input file, the fourth input file, or any combination thereof.

27. The system of claim 21, wherein a class module processor is configured to generate the one or more platform independent executable files based on the first input file, the second input file, the third input file, the fourth input file, or any combination thereof.

28. A system for generating runtime files for mapping data between devices on a network, the system comprising:
a computing processor means for receiving a plurality of input files comprising:
a first input file comprising data associated with service operation information, the service operation information including an operation definition that maps input data and at least one of request information for the operation definition or response information for the operation definition,
a second input file comprising data associated with mapping information, the mapping information including one or more mapping fields that map input data, one or more mapping logic operations for mapping input data, or any combination thereof, a third input file comprising a schema defining a formation of the service operation information, and a fourth input file comprising a schema defining the format of the mapping information; and a computing processor means for generating a plurality of runtime files based on the plurality of input files for mapping data between devices, the plurality of runtime files comprising:

a first runtime file comprising query information for controlling data exchange with a backend server, a second runtime file comprising business services definition information, the business services definition information defining associations with a business services application, and one or more executable files comprising platform independent executable files.

\* \* \* \* \*

UNITED STATES PATENT AND TRADEMARK OFFICE
CERTIFICATE OF CORRECTION

PATENT NO. : 7,657,557 B2 Page 1 of 1
APPLICATION NO. : 11/694530
DATED : February 2, 2010
INVENTOR(S) : Michael Andrew Super and Balaji Adikesavelu It is certified that error appears in the above-identified patent and that said Letters Patent is hereby corrected as shown below:

In claim 27, at column 28, line 48, claim reference numeral "21" should read as --20--

Signed and Sealed this

Sixth Day of April, 2010

David J. Kappos
*Director of the United States Patent and Trademark Office*